Oct. 22, 1963  H. J. RICHMAN, JR  3,107,734
DRILL MARKER LIFT
Filed Feb. 6, 1961  2 Sheets-Sheet 1
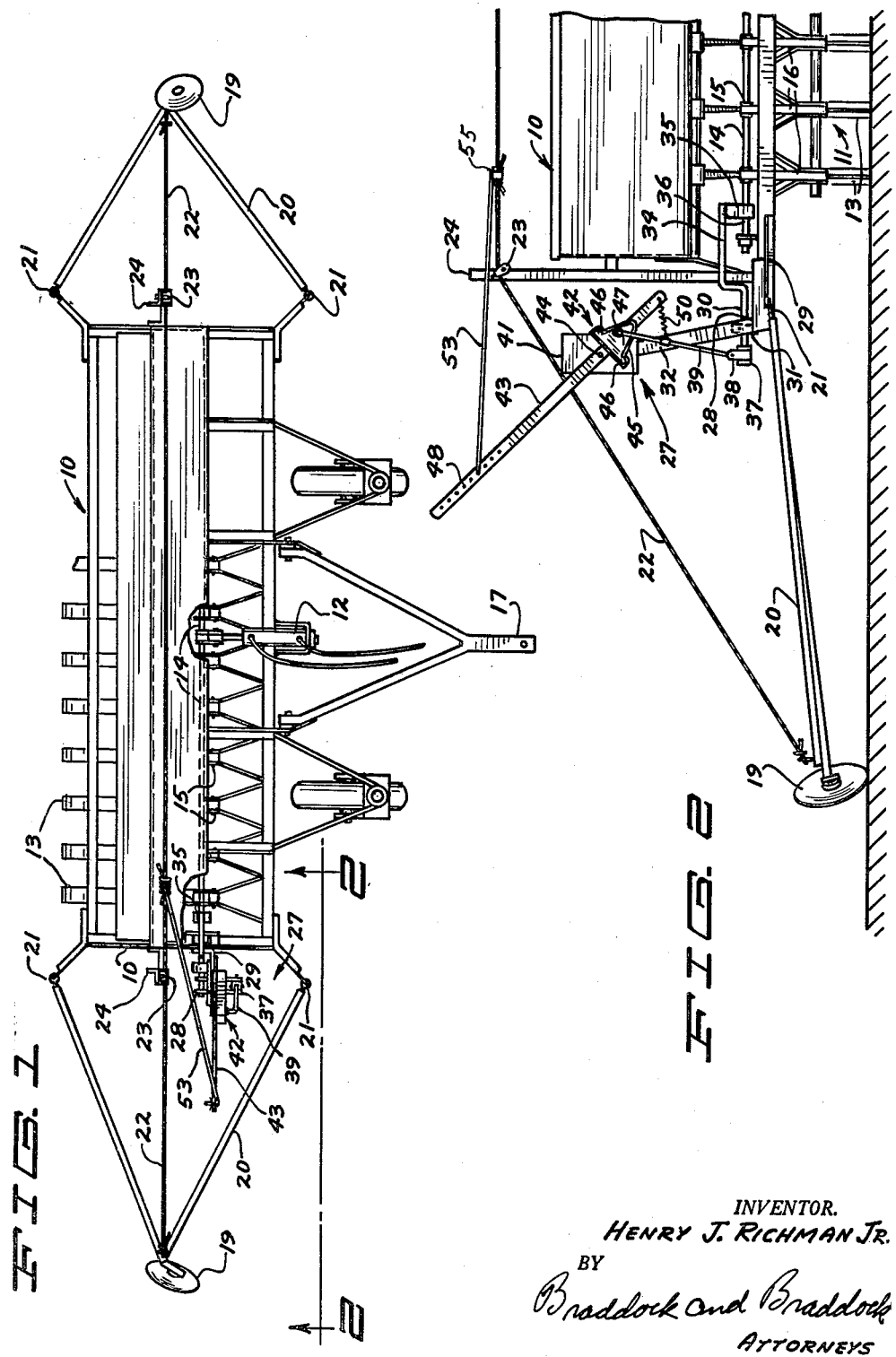
INVENTOR.
HENRY J. RICHMAN JR.
BY
Braddock and Braddock
ATTORNEYS Oct. 22, 1963    H. J. RICHMAN, JR    3,107,734
DRILL MARKER LIFT
Filed Feb. 6, 1961    2 Sheets-Sheet 2
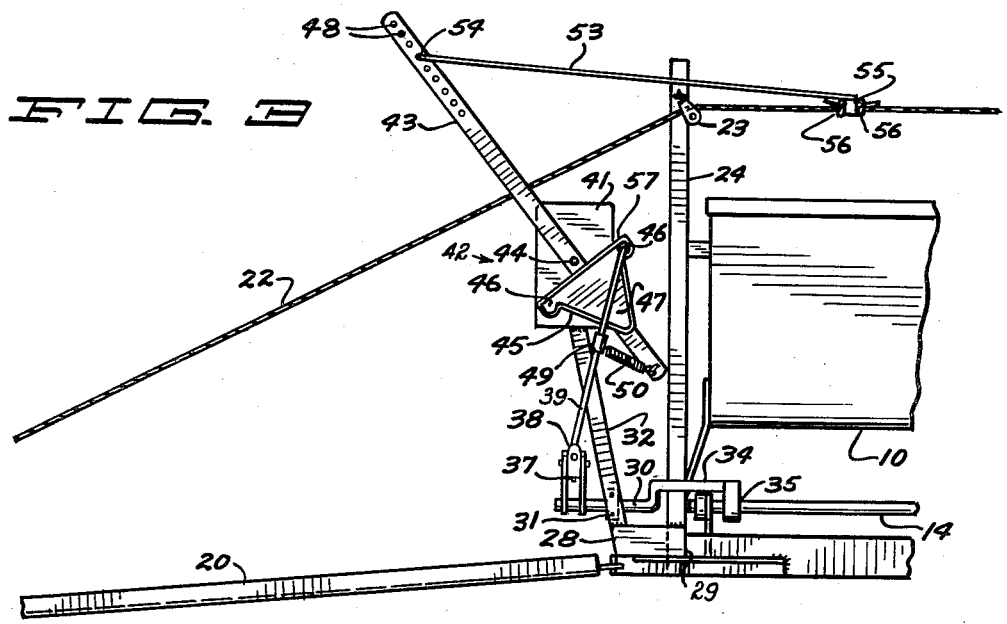
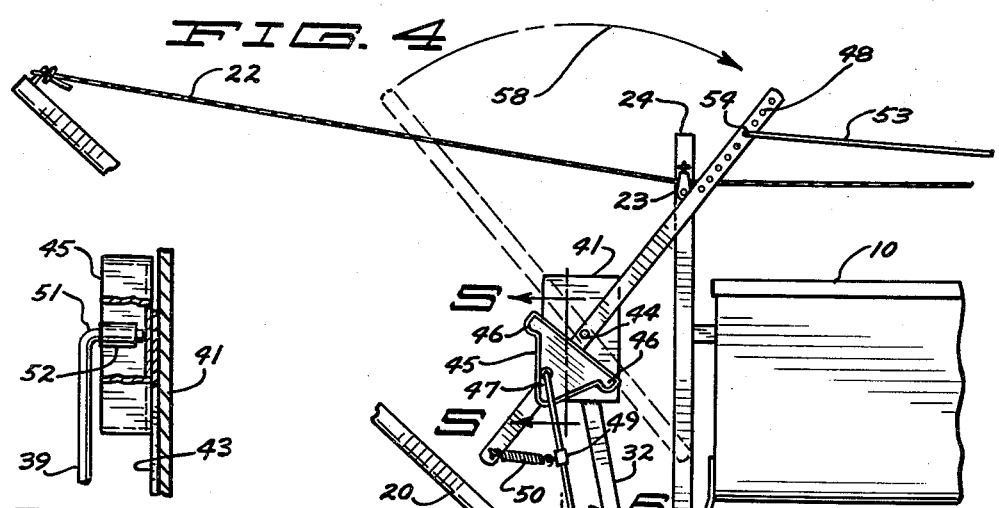
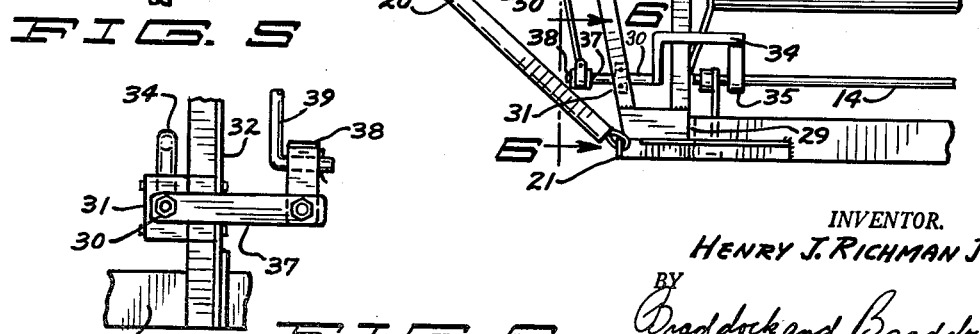
INVENTOR.
HENRY J. RICHMAN JR.
BY
Braddock and Braddock
ATTORNEYS

United States Patent Office 3,107,734
Patented Oct. 22, 1963

3,107,734
DRILL MARKER LIFT
Henry J. Richman, Jr., Tower City, N. Dak.
Filed Feb. 6, 1961, Ser. No. 87,330
5 Claims. (Cl. 172—128)

The present invention has relation to a lift for grain drill markers and more particularly to a lift that is automatically operated.

When seeding small grains it is common practice to use markers on the drill used in the seeding operation to indicate where the operator should drive on the next adjacent seeding path in order to avoid unseeded areas or overlaps of the seeded paths. Usually the drills have markers pivoted at each end thereof and positioned to extend to the unseeded area and mark a furrow to indicate where the center of the machine should be on the next adjacent round.

The customary practice in seeding is to start at one side of a field and travel back and forth across the field so that each new seed path is next adjacent the path previously planted. For example, when seeding toward the right the operator would start at the left side of a field and travel forwardly. The right hand marker on the drill would be down to make a mark and the left hand marker would be up. When the operator reached the end of the field he would turn 180 degrees and move to the right one drill width. The center of the drill would be over the mark made by the right hand marker during the previous pass. The right hand marker would then be raised and the left hand marker lowered to make a mark in the unseeded ground. The process would be repeated at each end of the field until the entire field was finished. The markers that are presently used generally have to be raised or lowered alternately by hand when the direction of travel is changed and this manual operation of the drill markers causes undue operator fatigue.

Previous devices that have been advanced for automatically raising and lowering the markers have been cumbersome, expensive or otherwise unmarketable.

The present invention in the form as disclosed, presents a device for raising and lowering drill markers that is actuated responsive to the raising and lowering of the furrow opener disc assemblies on the drill. An actuator lever is pivotally mounted with respect to a bracket that is mounted on the drill frame. The actuator arm has a push-pull link that is operably associated with a rope connected between the markers that are pivoted for upward and downward movement on opposite ends of the drill. A cam type actuator is fastened to the actuator lever and when the furrow opener discs are raised a connecting link is operative to move into a lobe or receptacle on the cam. When the furrow openers are lowered the connecting link pulls on the cam type actuator and forces the actuator lever to move in an arc and act on the rope to raise one of the markers and lower the other. The opener disc assemblies for the drill are raised at each end of the field and when the direction of travel has been changed, the opener discs are again lowered. When working in this manner, each of the markers is alternately raised and lowered to provide a guide for the operator on the next adjacent seeding path.

It is an object of the present invention to present a simple easily operated automatic drill marker lift for grain drills.

In the drawings,

FIG. 1 is a top plan view of a grain drill having a marker lift made according to the present invention installed thereon;

FIG. 2 is a fragmentary front elevational view of the device of FIG. 1;

FIG. 3 is a fragmentary enlarged front elevational view of the drill marker lift showing an actuator rod in position in an actuator cam;

FIG. 4 is a front elevational view of the device of FIG. 3 shown after the marker at that end of the drill has been raised;

FIG. 5 is a fragmentary vertical sectional view taken as on line 5—5 in FIG. 4; and FIG. 6 is a fragmentary side elevational view of an actuator shaft taken as on line 6—6 in FIG. 4.

Referring to the drawings and numerals of reference thereon, a grain drill 10 is provided with a plurality of disc opener assemblies 11 that are raised and lowered through the instrumentality of a hydraulic cylinder and piston assembly 12 or other power lift device. A plurality of press wheels 13 are used to cover the seed after it has been dropped into the ground in the furrow opened by the disc opener assemblies. The hydraulic cylinder 12 is connected to operate the disc opener assemblies by turning a square rock shaft 14. When the rock shaft 14 rotates under force from the hydraulic cylinder, a plurality of arms 15 move in an arc and each of the arms 15 has a link 16 that extends down to one of the disc opener assemblies and serves to raise or lower it.

The drill is pulled with a centrally located hitch pole 17 that may be attached to a tractor or other propelling device (not shown). It is customary when using the drill to work back and forth across a field. In other words, the operator will first go in one direction and when he comes to the end of the field will turn the unit 180 degrees, and proceed in the opposite direction while seeding a path next adjacent the previously seeded path. It is also customary to raise the disc assemblies and disengage the seeding mechanism at the end of the field before turning and to lower the disc assemblies when the turn has been completed. In order to avoid overlapping the seeded paths and also avoid skipping areas between the seeded paths, a pair of markers 20, 20, each having a ground engaging furrow marking disc 19, are used to indicate where the center of the tractor or other propelling vehicle should be on the next adjacent round. The arrangement of the drill and markers is a standard arrangement used on conventional grain drills. A separate one of the markers 20 is pivotally attached, as at 21, to each end of the grain drill 10. The markers are tied together with a rope 22 that is threaded through pulleys 23, 23 that are attached to upright standards 24, 24. The rope 22 is adjusted so that when one of the marker discs 19 is in the ground and is making a furrow mark the other marker is raised.

An automatic drill marker lift indicated generally at 27 includes a main mounting frame 28 that is fixedly attached to one end of the grain drill 10, as at 29 and has an upright column 32. An actuator shaft 30 is rotatably mounted with respect to frame 28 on a suitable bearing block 31. The center of actuator shaft 30 is aligned with the center of the square rock shaft 14. An offset portion 34 of the actuator shaft 30 extends up over the end of the drill frame and has an arm 35 operably associated with it. Arm 35 is also attached to rock shaft 14, as at 36. Thus when rock shaft 14 rotates, arm 35 will move in an arc and will move the offset portion of the actuator shaft 30 in an arc also. This will rotate actuator shaft 30 about its axis.

A second arm 37 is fixedly attached to the end of actuator shaft 30 and a knuckle 38 is pivotally fastened to the arm 37. A marker lift link 39 is pivotally mounted to knuckle 38 on a pivotal plane 90 degrees to the mounting between second arm 37 and the knuckle. The marker lift link 39 extends upwardly and is operably associated with a cam type actuator 42 that is fixedly attached with respect to an actuator lever 43 which, in turn, is pivotally attached, as at 44 to the main mounting frame 28. The upright column 32 of the main mounting frame 28 has a fixedly attached support plate 41 that serves to steady the actuator lever as it pivots.

The cam type actuator 42 has an outer peripheral rim 45 that is shaped with two lobes 46, 46 that are positioned on opposite sides of and spaced from the actuator lever 43. A lower portion 47 of the cam type actuator 42 is also provided. A portion of the actuator lever 43 extends downwardly from the cam type actuator 42 and a spring 50 is fastened to the lower portion thereof and to a collar 49 on link 39. The marker lift link 39 has a leg 51 that is bent at 90 degrees to the main part of the link and extends into the receptacle formed by the rim 45 of the cam type actuator 42. A roller 52 is rotatably positioned over the leg 39 to aid in the ease of operation of the link.

The actuator lever 43 extends upwardly and has a push-pull rod 53 pivotally mounted thereto, as at 54. A plurality of adjustment holes 48 are provided for adjusting the amount of travel of the push-pull rod. The push-pull rod 53 is mounted on the rope 22, as at 55, and is kept from sliding on the rope, once it has been properly positioned, by two knots 56, 56 or any other usual or preferred means.

*Operation*

When the operator is using a grain drill, with the disc assemblies 11 of the drill 10 in the ground, and with the disc 19 of the marker on a first end of the drill also in the ground and making a furrow mark for the next round, the marker lift link 39 will be positioned in the lower portion 47 of the cam type actuator 42 as seen in FIG. 2. The lower portion 47 is provided to allow some free movement of lift link 39 so that the furrow opener disc assemblies 11 may be adjusted their proper depth into the ground without making the marker lift inoperable. The actuator lever 43 will be positioned as shown in FIG. 2, inclined in a first direction with respect to a vertical line. In order to make the short turn necessary at the end of the field the operator will actuate the hydraulic cylinder 12 to lift the disc opener assemblies 11 by turning rock shaft 14. As the rock shaft 14 rotates the first arm 35 will also turn and will rotate actuator shaft 30.

As the actuator shaft 30 rotates, second arm 37 will move vertically and will push the marker lift link 39 upwardly. The marker lift link 39 will then move into the upper one of the lobes 46, as shown at 57 in FIG. 3.

When the turn has been completed, the farmer can safely lower the drill disc assemblies into the ground to resume seeding. When the discs lower, the rock shaft 14 will rotate in the opposite direction from the raising direction and second arm 37 will pull down on the marker lift link 39. As the marker lift link 39 moves downwardly the leg 51 will act on the lobe 46 in which it is located and will cause a force that will move the actuator lever 43 about its pivot in direction as indicated by arrow 58 in FIG. 4. As the actuator lever 43 moves about its pivot the push-pull rod 53 will act on the rope 22 to raise one of the markers while it lowers the other. When the marker being lowered extends farther out from its pivot point than the marker being raised it will continue to travel to the ground due to its greater effective weight without any further action from the actuator lever 43. The actuator lever 43 will go over center and will slope in the opposite direction as shown in FIG. 4. The marker lift link will come out of the lobe in which it was located and will move against the opposite side of the cam type actuator 42 under urging of spring 50 after the actuator lever goes over center. When the operator next raises the drill disc assemblies the marker lift link will go into the opposite lobe 46 from that previously acted upon and when the discs are lowered the marker that is in the ground will raise and the other marker will lower again.

In this manner the markers will be alternately raised and lowered automatically upon actuating the hydraulic cylinder or other power lift to raise and lower the drill disc assemblies.

An important feature of the device is that the power lift that is standard equipment on drills is not required to exert appreciable additional force when using the drill marker lift. When the drill disc assemblies are raised the lift link 39 is merely cocked or placed into the uppermost lobe 46 of the cam type actuator 42. When the drill disc assemblies are lowered, the weight of the disc assemblies alone is sufficient to exert a pull on the marker lift link that will cause one of the markers to raise and the other to lower.

A cover plate will normally be installed over the cam type actuator 42 in order to keep rocks and dirt out of the mechanism.

What is claimed is:

1. The combination with a grain drill having a pair of markers, one pivotally fastened adjacent each end thereof, said markers each being alternately movable from a first ground engaging marking position to a second ground clearing position, a plurality of furrow opener assemblies, and power means operative for moving said furrow opener assemblies selectively alternately between first planting and second ground clearing positions, of: a drill marker lift including a main frame member fixedly attached with respect to one end of said drill, an actuator lever pivotally fastened with respect to said main frame member, means operably connecting said markers and said actuator lever so when said actuator lever moves to a first lever position a first of said markers is in said first marker position and a second of said markers is in said second marker position and when said actuator lever moves to a second lever position said first marker is in said second marker position and said second marker is in said first marker position, cam means fixedly attached to said actuator lever, a link having a cam follower engageable with said cam means, and means connected between said link and said furrow opener assemblies and being operative to move said link to engage said cam means and thereby cause said lever to move alternately to said first lever position and to said second lever position in response to movement of said furrow opener assemblies to their first planting position.

2. The combination as specified in claim 1 wherein said means operably connecting said markers and said actuator lever includes a rope fixedly attached between said drill markers and being of sufficient length to hold one of said markers in said second position whenever the other of said markers is in said first position and connecting means between said actuator lever and said rope.

3. The combination as specified in claim 2 wherein said connecting means between said lever and said rope is constituted as a rigid rod.

4. The combination with a grain drill having a pair of markers, one pivotally fastened adjacent each end thereof, said markers each being movable from a first ground engaging marking position to a second ground clearing position, a plurality of furrow opener assemblies, and power means operative for moving said assemblies selectively alternately between upper transporting and lower planting positions, of: a drill marker lift including a main frame member fixedly attached with respect to one end of said drill and having an upright support column, a rope connected between said markers so that when a first of said markers is in said first marker position a second of said markers is in said second marker position and when said second marker is in said first marker position said first marker is in said second marker position, an actuator lever pivotally fastened with respect to said upright column, a rigid rod pivotally mounted to an upper portion of said lever and operably connected to said rope, a cam type actuator having actuator lobes on opposite sides of said actuator lever and being fixedly attached with respect to said actuator lever below said pivot between said lever and said column, an actuator shaft rotatably mounted with respect to said main frame and operably associated with said furrow opener assemblies and having an arm extending radially outwardly therefrom, and a link pivotally attached to said arm and extending to engage said cam type actuator, said link being operable to engage a first of said lobes of said cam type actuator as said arm moves upwardly responsive to the movement of said furrow opener assemblies to said upper transporting position with a first of said markers in said first position, said link being operable to pull downwardly on said first lobe to move said actuator lever above said pivot thus to move said first marker to said second position in response to movement of said furrow opener assemblies to said lower planting position, said link being movable to engage a second of said lobes when said link next moves upwardly in response to movement of said opener assemblies to said upper transporting position and to pull downwardly on said second lobe and move said first marker back to said first position when said opener assemblies again move to said lower planting position.

5. The combination with a grain drill having a pair of markers, one pivotally fastened adjacent each end thereof, said markers being movable from a first ground engaging marking position to a second ground clearing position, said drill having furrow opener assemblies and power means operative for moving said opener assemblies selectively alternately between upper transporting and lower planting positions, of: a drill marker lift including a main frame member fixedly attached with respect to one end of said drill and having an upright support column, a support plate fixedly attached to an upper end of said upright column, an actuator lever pivotally mounted on said support plate, a rope fixedly attached between said markers of said drill so that when a first of said markers is in said first marker position a second of said markers is in said second marker position and when said second marker is in said first marker position said first marker is in said second marker position, a push-pull rod pivotally mounted to an upper portion of said actuator lever and operably associated with said rope, said actuator lever being movable from a first lever position with said first marker in said first marker position to a second lever position with said first marker in said second marker position, said actuator lever being inclined from the vertical direction substantially equal and in opposite amounts when in said first and said second lever positions, a cam type actuator having lobes positioned on opposite sides of said actuator lever and spaced outwardly from said lever pivot, an actuator shaft rotatably mounted on said frame and operably associated with said furrow opener assemblies and having an arm extending radially outwardly therefrom, a link pivotally connected to said arm and engaging said cam type actuator, said link being positioned to engage a first of said lobes with said actuator lever in said first lever position when said furrow opener assemblies are moved to said upper transporting position, said link being operable to pull downwardly on said first lobe to move said actuator lever to said second lever position when said furrow opener assemblies are moved to said lower planting position, said link being positioned to engage a second of said lobes with said actuator lever in said second lever position when said furrow opener assemblies are next moved to said upper transporting position, said link being operable to pull downwardly on said second lobe to move said actuator lever to said first lever position when said furrow opener assemblies are moved to said lower planting position, and resilient means connected between said link and a portion of said actuator lever below its pivot.

References Cited in the file of this patent

UNITED STATES PATENTS

| | | |
|---|---|---|
| 2,546,412 | White et al. | Mar. 27, 1951 |
| 2,786,405 | Murphy et al. | Mar. 26, 1957 |
| 2,827,843 | Tea | Mar. 25, 1958 |